June 13, 1961 J. W. HAANSTRA ET AL 2,987,803

METHOD OF CALIBRATING A SERVOMECHANISM

Filed May 8, 1958

INVENTORS
JOHN W. HAANSTRA
JOHN M. HARKER

BY

Richard E. Cummins

ATTORNEY

United States Patent Office 2,987,803
Patented June 13, 1961

2,987,803
METHOD OF CALIBRATING A SERVO-MECHANISM

John W. Haanstra, Greenwich, Conn., and John M. Harker, Palo Alto, Calif., assignors to International Business Machines Corporation, New York, N.Y., a corporation of New York Filed May 8, 1958, Ser. No. 733,897
6 Claims. (Cl. 29—155.5)

This invention relates to servomechanisms for moving a member to various locations with relation to a cooperating, fixed member in accordance with electrical conditions set up for bringing about such motion, and is a division of copending application Serial No. 555,906. More particularly, this invention relates to a method for calibrating a servomechanism. The invention has particular application for calibrating a device in which a slidable carrier is moved to position a magnetic transducer at predetermined recording locations upon a magnetic recording medium or at a selected one of a plurality of similar recording media as shown in copending application Serial No. 477,468 filed December 24, 1954.

An object of the invention is to provide an improved method for calibrating a servomechanism.

Another object of this invention is to provide an improved method for locating taps on a potentiometer employed in a servomechanism.

A further object is to provide an accurate calibration of a potentiometer for controlling a servomechanism, having random increments of travel.

Other objects of the invention will be pointed out in the following description and claims and illustrated in the accompanying drawing, which discloses, by way of example, the principle of the invention and the best mode which has been contemplated of applying that principle.

Figure 1:
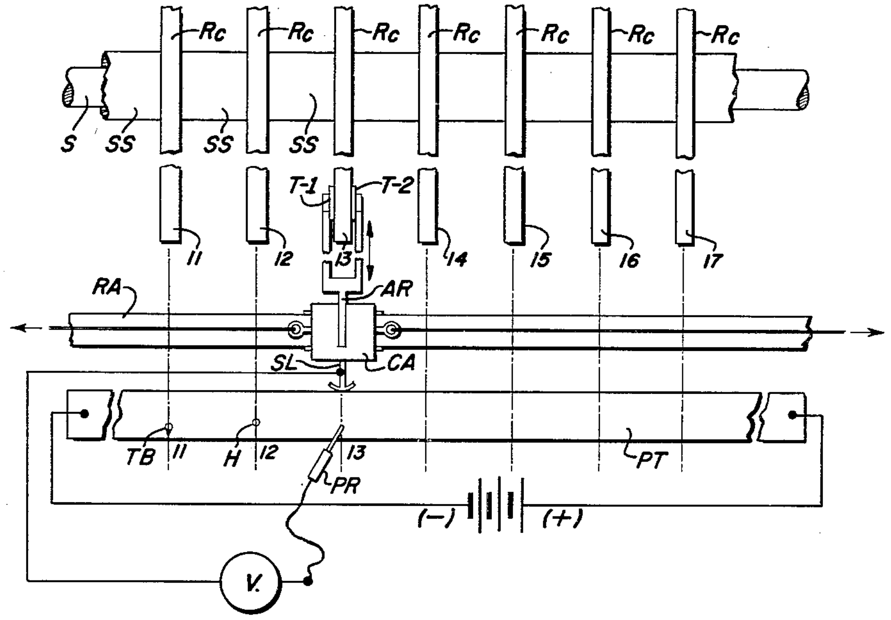

FIG. 1 of the drawing illustrates diagrammatically a novel method of calibrating a potentiometer of a servomechanism adapted to move a member.

Figure 2:
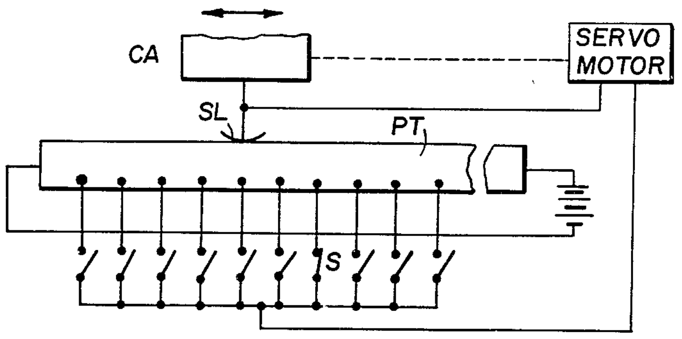

FIG. 2 illustrates schematically a servomechanism employing the calibrated potentiometer shown in FIG. 1.

Referring to FIG. 1, a shaft S carries a plurality of magnetic discs R*c* separated by spacers SS. As shown in the drawing, these discs are numbered from 11 to 17 consecutively, each of the discs being arranged to cooperate with a transducer yoke carrying a pair of magnetic transducers T1 and T2 by which data is transferred to and from disc R*c*. The yoke is carried by an arm AR supported by a carrier CA which in turn is moved along a rail RA by a reversible motor mechanism (not shown). The carrier CA also is provided with a slider SL for making contact with the surface of a potentiometer PT.

FIG. 1 merely illustrates one type of arrangement wherein the present invention may be advantageously employed. This figure is a diagrammatic showing of the magnetic disc memory unit described in copending application Serial No. 477,468 mentioned above. As explained therein, the discs or records function to store magnetic representations of binary coded data signals supplied to the transducers T1 and T2. Each record R*c* includes a number of recording tracks. Transducers T1 and T2 may be selectively positioned to any track on any disc by means of a suitable positioning mechanism including a carrier CA which moves parallel to the axis of shaft S and an arm AR which moves parallel to the planes of the records R*c*. The positioning mechanism is actuated by a servomechanism which includes the potentiometer PT. Another representative arrangement wherein the present invention may be advantageously employed is shown in copending application Serial No. 555,006, entitled "Positioning Mechanism," filed December 23, 1955, and assigned to the assignee of the present invention.

Since the transducers T1 and T2 carried by the yoke extending from the arm AR must, of necessity, in a magnetic recording apparatus of this kind coact very accurately with a magnetic recording surface such as the disc 13, even minor inaccuracies of the spacers SS, the discs R*c*, or the mechanical wobble or deviation of the discs R*c* in rotation make it necessary that the positioning of the carrier CA relative to a selected disc R*c* be absolutely accurate when the null voltage condition is obtained in the servomechanism. The potentiometer PT, therefore, must be very accurately calibrated so that a terminal TB is provided at each null potential corresponding to a disc position 11, 12, 13, 14, etc. It is obvious that a wire-wound potentiometer serving as the potentiometer PT will introduce inaccuracies since the slider SL may very well, at its null position with respect to the control potential applied, make contact with two turns or otherwise provide an unbalanced condition at the proper position. Furthermore, since there are mechanical inaccuracies in the spacing of the discs R*c* upon the shaft S, it has been found that the proper distances between accurate positions of the carrier CA vary by several thousandths of an inch, the tolerance permissible being only a few ten-thousandths of an inch. Consequently, the employment of a series of high precision resistors having the terminal connections between each pair of resistors is also unsuitable for an application of a servomechanism where accuracy of this kind is required.

Figs. 1 and 2 show the use of a strip of conductive material which is mounted parallel with the line of travel of the carrier CA. Although the conductive strip may have uniform resistance, it is not necessary. The strip is arranged to extend the entire length of travel of the carrier CA and the slider SL which is moved by the carrier CA, and at any position of a disc such as the disc 13 the slider SL will make contact with the strip PT. In the calibrating process the carrier CA is adjusted manually until the yoke on the arm AR straddles the disc 13 so that the transducers T1 and T2 are suitably spaced respectively from the flat surface of the disc 13. A D.C. potential is now applied across the ends of the resistance strip PT, which may be a conductive plastic, and a lead is provided from the slider SL to a sensitive voltmeter V, preferably of the vacuum tube type, the other terminal of the voltmeter being connected to a probe PR. The probe PR is moved across the opposite edge of the conductive plastic strip PT until it reaches a position where the voltmeter shows no voltage. This position is then marked and a hole is drilled as, for example, at 12 (see H), or a tab connection is made by installing a metallic conductor tab through a drilled hole to provide a terminal as at 11 (see the tab TB). It will be seen that the position of this tap is determined by the potential of the slider SL which, in turn, is directly dependent on the position of the carrier CA relative to the record RC. The reason for this is that with the carrier CA accurately positioned relative to the record R*c* and a potential applied across the potentiometer PT, the slider SL assumes the potential of the point on the potentiometer with which it is in contact. Since the voltmeter V measures the absolute potential difference between the two points to which its leads are connected, the step of moving the probe along the potentiometer until the voltmeter reads zero indicates that the point on the potentiometer in contact with the probe is at the same potential as the slider SL. The placement of the tap at this point is thus dependent on the position of carrier CA. In this manner a terminal is provided on the plastic resistor strip PT for each disc position of the carrier CA (normally these positions would correspond approximately to the center lines crossing the strip PT in the drawing).

With referenec to Fig. 2, it will be seen that if a switch S is closed, the potential developed between the slider SL and the closed switch causes the servomotor to move the carrier CA and slider SL until this potential is zero. Zero potential is obtained when the slider and the carrier reach the same position which originally determined the placement of the tap.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. The method of determining the placement of taps on a potentiometer of a servomechanism operable to move a member along a path adjacent said potentiometer to preselected locations in response to a control voltage obtained between an element disposed in sliding contact with said potentiometer and movable therealong in accordance with the movement of said member and a selected one of said taps, comprising the steps of positioning said potentiometer in an untapped condition along said path in engaging relationship with said slider, positioning said member at one of said preselected locations with said slider contacting said potentiometer, applying a voltage across said potentiometer, locating a point on said potentiometer whose potential has a predetermined relationship with respect to the potential of said element with said member positioned at said one preselected location, and providing an indication at said located point for subsequent placement of a tap.

2. The method of accurately placing taps on a potentiometer of a servomechanism operable to move a member adapted to be moved along a path adjacent said potentiometer to preselected differently spaced locations in response to a control voltage developed between an element disposed in contact with said potentiometer and movable therealong in accordance with the movement of said member and a selected one of said taps, comprising the steps of mounting said potentiometer in an untapped condition in a fixed position relative to said path, positioning said member at one of said preselected locations with said slider contacting said potentiometer, applying a voltage across said potentiometer, locating a point on said potentiometer whose potential corresponds accurately with the potential of said element when said member is positioned at said one preselected location, and placing a tap connection at said located point.

3. The invention recited in claim 2 in which said potentiometer comprises a strip of conductive material.

4. The invention recited in claim 3 in which said conductive material is a plastic.

5. The invention recited in claim 3 in which said element engages one edge of said strip and said taps are placed on the opposite edge of said strip.

6. The invention recited in claim 3 in which said point is located by connecting one terminal of a voltmeter to said element and the other terminal to a probe, and moving said probe along said strip until said voltmeter provides a predetermined indication.

References Cited in the file of this patent

UNITED STATES PATENTS 2,419,952 Konicek ---------------- May 6, 1947